United States Patent
Yokoyama et al.

(10) Patent No.: US 11,042,996 B2
(45) Date of Patent: Jun. 22, 2021

(54) RECOGNITION APPARATUS

(71) Applicant: DENSO CORPORATION, Kariya (JP)

(72) Inventors: Takahisa Yokoyama, Kariya (JP); Kensuke Yokoi, Kariya (JP); Tatsuru Kuwabara, Kariya (JP)

(73) Assignee: DENSO CORPORATION, Kariya (JP)

( * ) Notice: Subject to any disclaimer, the term of this patent is extended or adjusted under 35 U.S.C. 154(b) by 71 days.

(21) Appl. No.: 16/439,000

(22) Filed: Jun. 12, 2019

(65) Prior Publication Data
US 2019/0347810 A1 Nov. 14, 2019

Related U.S. Application Data

(63) Continuation of application No. PCT/JP2017/042416, filed on Nov. 27, 2017.

(30) Foreign Application Priority Data

Dec. 13, 2016 (JP) .............................. JP2016-241223

(51) Int. Cl.
*G06T 7/20* (2017.01)
*G06T 7/292* (2017.01)
(Continued)

(52) U.S. Cl.
CPC .......... *G06T 7/292* (2017.01); *G06K 9/00288* (2013.01); *G07C 5/0816* (2013.01)

(58) Field of Classification Search
CPC ........... G06T 7/292; G06T 2207/10016; G06T 2207/30252; G06T 7/246; G06T 1/00;
(Continued)

(56) References Cited

U.S. PATENT DOCUMENTS 9,131,120 B2 9/2015 Schofield et al.
2005/0192725 A1* 9/2005 Li ............................ B60R 1/00
701/36
(Continued)

FOREIGN PATENT DOCUMENTS

JP 2005-250645 A 9/2005
JP 2007-036668 A 2/2007
(Continued)

*Primary Examiner* — Qian Yang
(74) *Attorney, Agent, or Firm* — Maschoff Brennan

(57) ABSTRACT

A recognition apparatus is provided which includes an input section that receives image information from a front camera and a rear camera, and a calculation section that performs a forward recognition process that is a recognition process targeting the image information from the front camera received by the input section and a rearward recognition process that is a recognition process targeting the image information from the rear camera received by the input section. The calculation section includes an acquisition section that acquires first information representing whether an own vehicle is in a state of moving forward or a state of moving rearward and second information representing a traveling condition of the own vehicle, and a process selection section that selects processes to be performed as the forward recognition process and the rearward recognition process, based on the first and second information acquired by the acquisition section.

21 Claims, 4 Drawing Sheets

(51) Int. Cl.
*G06K 9/00* (2006.01)
*G07C 5/08* (2006.01)
(58) Field of Classification Search
CPC ........... G06K 9/00288; G06K 9/00791; G07C 5/0816; B60R 1/00; B60R 21/00; G08G 1/16
See application file for complete search history.

(56) References Cited

U.S. PATENT DOCUMENTS

| | | | |
|---|---|---|---|
| 2012/0249791 A1* | 10/2012 | Shen | B60R 1/00 348/148 |
| 2014/0321759 A1* | 10/2014 | Kamiya | G06K 9/6215 382/217 |
| 2015/0195500 A1 | 7/2015 | Usui et al. | |
| 2016/0098606 A1 | 4/2016 | Nakamura et al. | |
| 2019/0084419 A1* | 3/2019 | Suzuki | G09G 3/346 |

FOREIGN PATENT DOCUMENTS

| | | |
|---|---|---|
| JP | 2013-018406 A | 1/2013 |
| JP | 2014-32540 A | 2/2014 |
| JP | 2015014819 A | 1/2015 |

* cited by examiner

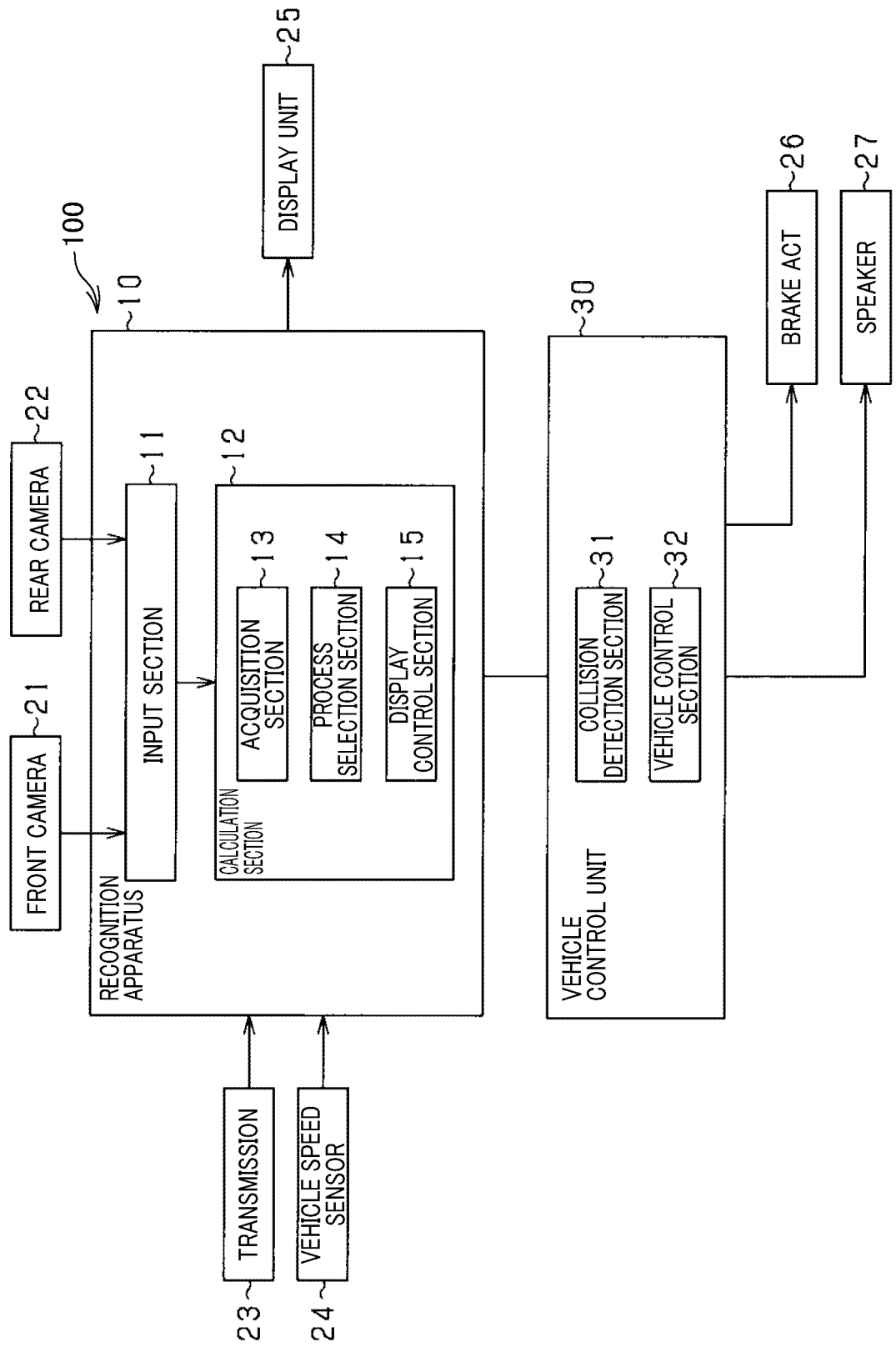

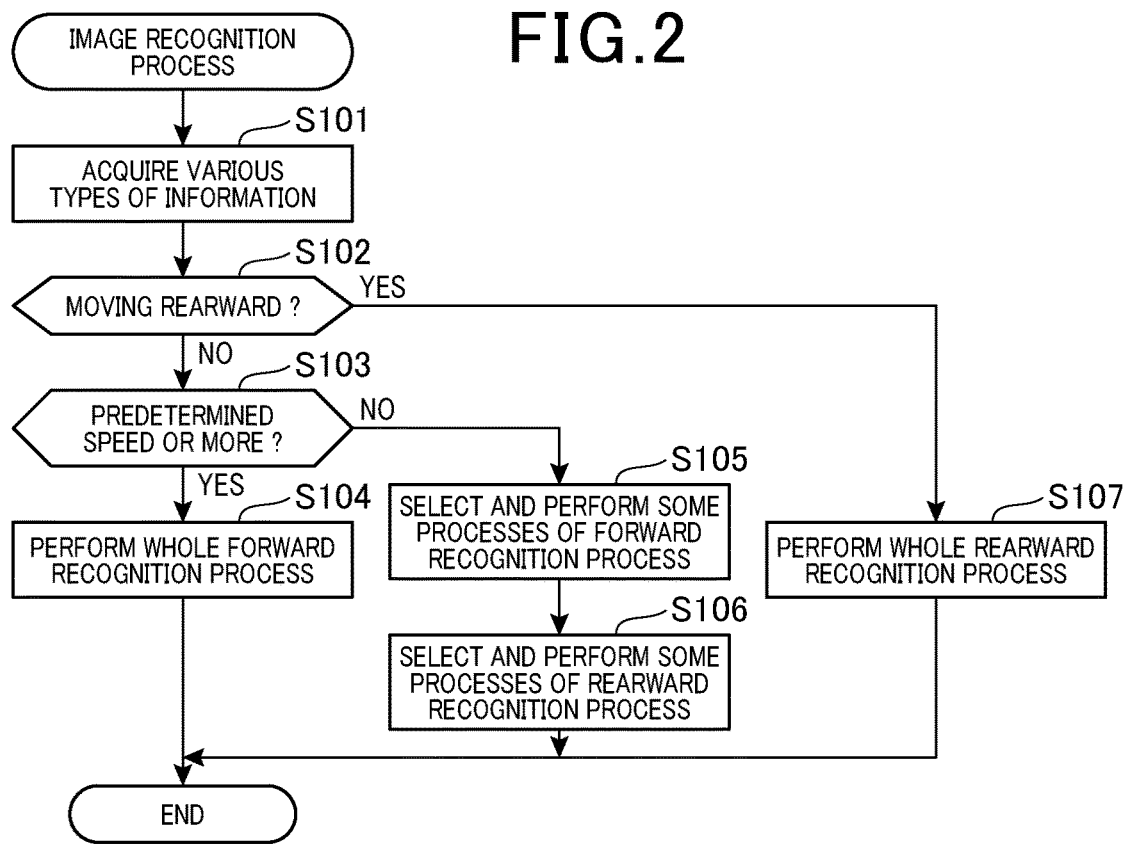
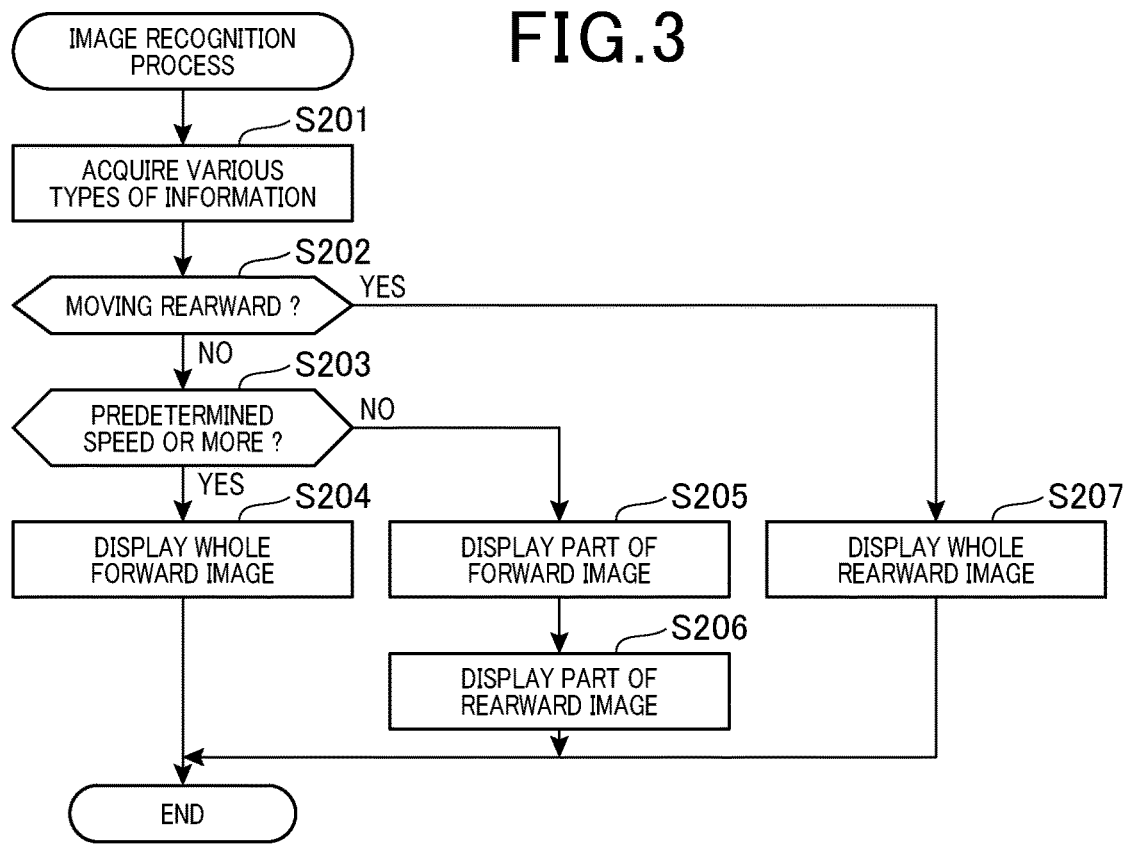

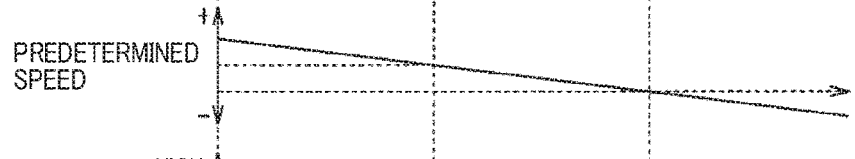
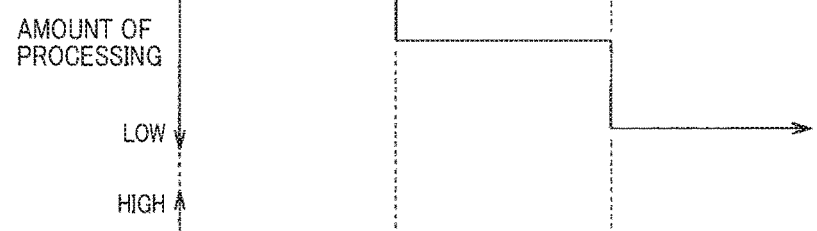
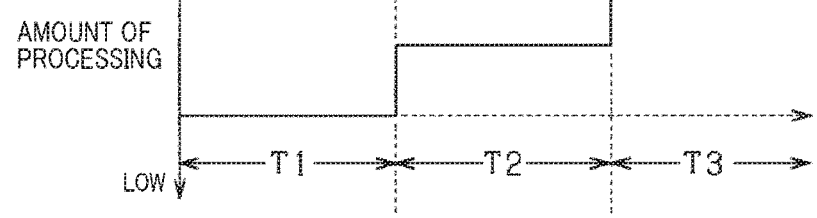

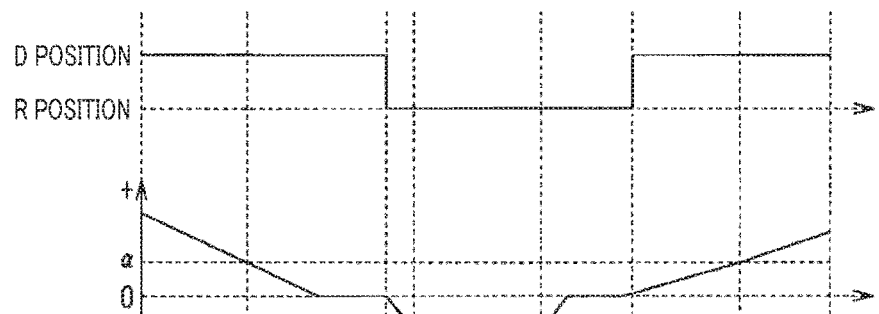
FIG. 5A SHIFT POSITION
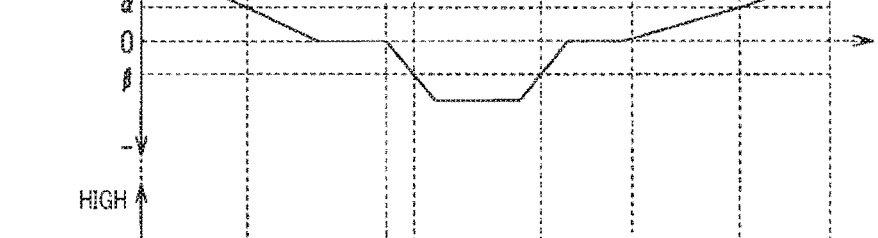
FIG. 5B VEHICLE SPEED SENSOR
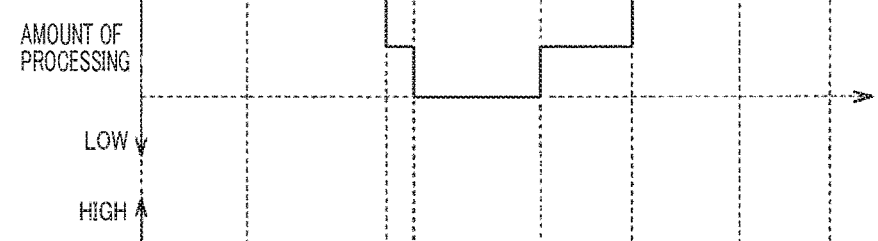
FIG. 5C FORWARD RECOGNITION PROCESS
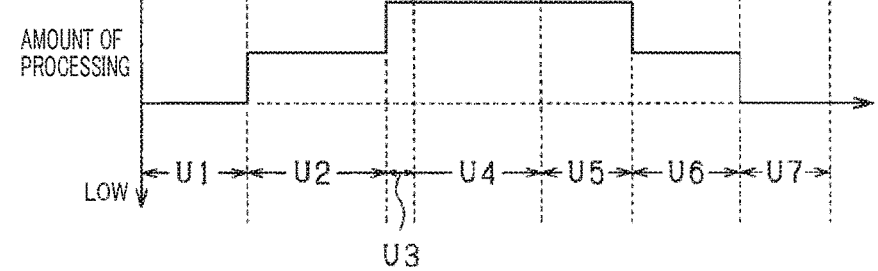
FIG. 5D REARWARD RECOGNITION PROCESS

US 11,042,996 B2

RECOGNITION APPARATUS

CROSS-REFERENCE TO RELATED APPLICATION

This application is based on and claims the benefit of priority from earlier Japanese Patent Application No. 2016-241223 filed Dec. 13, 2016, the description of which is incorporated herein by reference.

BACKGROUND

Technical Field

The present disclosure relates to a recognition apparatus that recognizes information on a periphery based on an image captured by a camera.

Related Art

Conventionally, in vehicles, various processes are performed based on images captured by a plurality of in-vehicle cameras.

SUMMARY

As an aspect of the present disclosure, a recognition apparatus is provided which includes: an input section that receives image information from a front camera and a rear camera; and a calculation section that performs a forward recognition process that is a recognition process targeting the image information from the front camera received by the input section and a rearward recognition process that is a recognition process targeting the image information from the rear camera received by the input section. The calculation section includes: an acquisition section that acquires first information representing whether an own vehicle is in a state of moving forward or a state of moving rearward and second information representing a traveling condition of the own vehicle; and a process selection section that selects processes to be performed as the forward recognition process and the rearward recognition process, based on the first and second information acquired by the acquisition section.

BRIEF DESCRIPTION OF THE DRAWINGS

In the accompanying drawings:
FIG. 1 is a block diagram illustrating a recognition system;
FIG. 2 is a flowchart of an image recognition process;
FIG. 3 is a flowchart of an image display process;
FIG. 4A is a timing diagram of a shift position;
FIG. 4B is a timing diagram of speed of an own vehicle;
FIG. 4C is a timing diagram of the amount of processing of a forward recognition process;
FIG. 4D is a timing diagram of the amount of processing of a rearward recognition process;
FIG. 5A is a timing diagram of a shift position according to an embodiment;
FIG. 5B is a timing diagram of speed of the own vehicle according to the embodiment;
FIG. 5C is a timing diagram of the amount of processing of a forward recognition process according to the embodiment; and
FIG. 5D is a timing diagram of the amount of processing of a rearward recognition process according to the embodiment.

DETAILED DESCRIPTION OF THE PREFERRED EMBODIMENTS

Conventionally, in vehicles, various processes are performed based on images captured by a plurality of in-vehicle cameras (e.g., U.S. Pat. No. 9,131,120). In U.S. Pat. No. 9,131,120, an image synthesis process is performed based on a rearward image captured by a rear camera provided to the rear of a vehicle and a rearward image captured by a side camera provided to a sideview mirror. The synthetic image generated by the synthesis process is displayed on a display installed in the vehicle. Accordingly, using images captured by a plurality of cameras can enable checking of conditions around the vehicle in a wide area.

Recently, there are vehicles that recognize information in an area in front of the vehicle based on a forward image captured by a front camera and recognize information in an area behind the vehicle based on a rearward image captured by a rear camera. Such a vehicle is provided with, in addition to a calculation section performing calculation based on a forward image, a calculation section performing calculation based on a rearward image. This complicates the configuration of a system installed in the vehicle.

The present disclosure, which has been made to solve the above-described problem, is directed to providing a recognition apparatus of which the configuration can be simplified.

First Embodiment

Embodiments of the present disclosure will be described below with reference to the drawings. In the following embodiments, the same or equivalent portions are given the same reference numerals in the drawings.

A recognition apparatus 10 according to an embodiment will be described with reference to the drawings. As shown in FIG. 1, the recognition apparatus 10 is connected to a front camera 21 so as to communicate therewith. The front camera 21 is, for example, a monocular imaging device such as a CCD camera, a CMOS image sensor, a near-infrared camera, or the like. The front camera 21 is disposed, for example, in the vicinity of the upper edge of a windshield of a vehicle, and captures images of a surrounding environment including a road ahead of the own vehicle. The front camera 21 captures images of the surrounding environment ahead of the own vehicle (e.g., within 0 m to 200 m). In addition, the front camera 21 is mounted at the center of the vehicle in the vehicle width direction, and captures images of an area extending ahead of the vehicle within a predetermined angular angle (e.g. 20° to 50°).

Forward image information including a forward image captured by the front camera 21 is output to the recognition apparatus 10. Although the front camera 21 in the present embodiment is a monocular camera, a plurality of cameras (compound eye camera) may be provided.

The recognition apparatus 10 is connected to a rear camera 22 so as to communicate therewith. The rear camera 22 is, for example, a monocular imaging device such as a CCD camera, a CMOS image sensor, a near-infrared camera, or the like. The rear camera 22 is disposed, for example, on a rear bumper of the vehicle or a license plate at the rear of the vehicle, and captures images of a surrounding environment including a road behind the own vehicle. The rear camera 22 captures images of the surrounding environment behind the own vehicle (e.g., 0 m to 20 m). In addition, the rear camera 22 is mounted at the center of the vehicle in the vehicle width direction, and captures images of an area extending behind the vehicle within a predetermined angular angle (e.g., 140° to 180°). That is, although the rear camera 22 can perform imaging at a distance shorter than the front camera 21 can perform imaging, the rear camera 22 can perform imaging at an angle wider than the front camera 21 can perform imaging. Rearward image information including a rearward image captured by the rear camera 22 is output to the recognition apparatus 10. Although the rear camera 22 in the present embodiment is a monocular camera, a plurality of cameras (compound eye camera) may be provided.

The recognition apparatus 10 is connected to a transmission 23 so as to communicate therewith. The transmission 23 sets a shift position of the own vehicle. Specifically, when a shift lever, not shown, or the like is operated by the driver, the transmission 23 sets a shift position of the vehicle. The shift position includes at least, for example, an R position (reverse) indicating a state where the own vehicle moves backward and a D position (drive) indicating a state where the own vehicle moves forward. The shift position additionally includes an N position (neutral), a P position (parking), and the like. The recognition apparatus 10 acquires information representing the shift position of the vehicle from the transmission 23.

The recognition apparatus 10 is connected to a vehicle speed sensor 24 provided to the vehicle so as to communicate therewith. The vehicle speed sensor 24 is a sensor that detects a vehicle speed of the own vehicle. The recognition apparatus 10 acquires information representing a vehicle speed of the own vehicle from the vehicle speed sensor 24.

The recognition apparatus 10 is a computer including an input section 11 such as an input interface and a calculation section 12 such as a CPU. In addition, the recognition apparatus 10 also includes an output interface, a RAM, and a ROM. The calculation section 12 performs various functions of an acquisition section 13 that acquires information, a process selection section 14 that selects processes to be performed, and a display control section 15 that controls a display unit 25. The calculation section 12 executes a program stored in the recognition apparatus 10 to implement the various functions. The recognition apparatus 10 is integrated with the front camera 21, and is disposed, together with the front camera 21, in the vicinity of the upper edge of a windshield of the vehicle. That is, the recognition apparatus 10 is separated from the rear camera 22, and is disposed separately from the rear camera 22. A recognition apparatus 100 according the present embodiment includes the recognition apparatus 10, the front camera 21, and the rear camera 22.

The recognition apparatus 10 is connected to the display unit 25 that displays a forward image and a rearward image, so as to communicated therewith. The display unit 25 is disposed, for example, in the vicinity of the driver's seat in the interior of the vehicle, so that the driver can view the display unit 25.

The recognition apparatus 10 is connected to a vehicle control unit 30 so as to communicate therewith. The vehicle control unit 30 is a computer including a CPU, a ROM, a RAM, an input-output interface and the like. The vehicle control unit 30 performs various functions based on information on a periphery recognized by the recognition apparatus 10. The various functions performed by the vehicle control unit 30 include, for example, functions of a collision detection section 31 that performs collision detection and a vehicle control section 32 that performs vehicle control. The various functions are performed by executing a program stored in the vehicle control unit 30. The various functions may be implemented by electronic circuits, which are hardware. Alternatively, some of the various functions may be implemented by software, that is, processes performed on a computer. In addition, functions for vehicle control performed by the vehicle control unit 30, especially, functions concerning driving support in the vehicle may include an ACC (Adaptive Cruise Control), a lane keeping assist function, and a parking assist function and the like.

The vehicle control unit 30 is connected to a brake ACT (actuator) 26 and a speaker 27 via dedicated lines of, for example, serial communication. The vehicle control unit 30 controls opening and closing and an opening of a valve of the brake ACT 26 to apply a brake to the own vehicle. The brake ACT 26 increases, maintains, and decreases wheel cylinder pressure of each wheel by hydraulic pressure generated in working fluids by pumps to control acceleration (deceleration) of the own vehicle. The vehicle control unit 30 controls the speaker 27 so as to output sounds such as a warning sound.

The collision detection section 31 of the vehicle control unit 30 performs collision detection based on information on the periphery of the vehicle received by the vehicle control unit 30. Specifically, when a pedestrian has been recognized on the periphery of the vehicle (information representing presence of a pedestrian is received), the collision detection section 31 determines whether the own vehicle will collide with the pedestrian. For example, the collision detection section 31 estimates a course of the pedestrian to be a determined based on information on the pedestrian (information on, for example, a position, a speed, and a traveling direction), and estimates a course of the own vehicle based on states of the own vehicle (a speed, and a traveling direction). Then, the collision detection section 31 determines whether a collision will occur based on whether the estimated course of the pedestrian and the estimated course of the own vehicle cross each other. It is noted that if the distance to a predicted collision point (cross point) is a predetermined distance or less, of if a time to collision (TTC) is a predetermined time or less, it may be determined that a collision will occur.

When another vehicle has been recognized on the periphery of the vehicle (information representing presence of another vehicle is received), the collision detection section 31 performs collision detection as in the case of a pedestrian. When an obstacle has been recognized on the periphery of the vehicle (information representing presence of an obstacle is received), the collision detection section 31 calculates a distance based on a position of the obstacle and a position of the own vehicle. If the distance is a predetermined distance or less, the collision detection section 31 determines that a collision will occur. When an obstacle is present on the estimated traveling course of the own vehicle, and if the distance is the predetermined distance or less, it may be determined that a collision will occur. If the time to collision is the predetermined time or less, it may be determined that a collision will occur.

If the collision detection section 31 determines that a collision will occur, the vehicle control section 32 performs vehicle control. Specifically, the vehicle control section 32 changes the vehicle control to be performed based on the distance to a target determined to cause a collision. For example, if the distance is a predetermined warning distance or more, the vehicle control section 32 controls the speaker 27 so as to output a warning sound. In contrast, if the distance is less than a predetermined distance, the vehicle control section 32 controls the brake ACT 26 so as to apply a brake to the own vehicle.

Next, the recognition apparatus 10 will be described in detail. The input section 11 of the recognition apparatus 10 is an input interface receiving signals from the outside of the recognition apparatus 10. The input section 11 receives forward image information from the front camera 21 and receives a rearward image information from the rear camera 22. The input section 11 receives forward image information and rearward image information at predetermined intervals.

When forward image information and rearward image information are received, the calculation section 12 of the recognition apparatus 10 performs a correction process for correcting distortions of a forward image and a rearward image. Specifically, since the angle of an area whose image is captured by the rear camera 22 is wide, distortion occurs at an edge of the rearward image due to properties of a camera lens. Performing various processes in a state where a distortion has occurred causes errors. Hence, the calculation section 12 of the recognition apparatus 10 performs the correction process for correcting distortions of the forward image and the rearward image.

The calculation section 12 of the recognition apparatus 10 performs a recognition process targeting forward image information (hereinafter, it may be referred to as a forward recognition process) and a recognition process targeting rearward image information (hereinafter, it may be referred to as a rearward recognition process). The forward recognition process and the rearward recognition process are performed to recognize various pieces of information to be recognized on the periphery of the own vehicle. Processes performed as the forward recognition process include, for example, a pedestrian recognition process, a vehicle recognition process, an obstacle recognition process, a lane marking recognition process, and a road sign recognition process. Processes performed as the rearward recognition process include, for example, a pedestrian recognition process, a vehicle recognition process, an obstacle recognition process, and a lane marking recognition process. These are examples, and processes for recognizing other information may be included. Conversely, the exemplified processes may not be included.

The pedestrian recognition process is a process for recognizing a pedestrian as a recognition target. In the pedestrian recognition process, the calculation section 12 calculates, for example, a motion vector for each pixel in a captured image. The motion vector is a vector indicating a direction and a magnitude of change in time series in each pixel configuring a target such as a pedestrian. The value of the motion vector is calculated based on a frame image at each time forming the captured image. Next, the calculation section 12 performs labeling for pixels including motion vectors having the same direction and the magnitude, and extracts a minimum rectangular area, which surrounds the pixels subjected to the labelling, as a target. Then, the calculation section 12 performs known pattern matching for the extracted target, and recognizes whether the type of the target is a pedestrian. For example, in the pedestrian recognition process, the calculation section 12 recognizes a pedestrian from the captured image by using dictionary information for pedestrians. The dictionary information is stored in, for example, a storage section (e.g., ROM) of the recognition apparatus 10.

When the calculation section 12 detects a pedestrian by pattern matching, dictionary information for detecting features of part of the pedestrian may be used. The calculation section 12 may recognize a target or determine a direction of the target by using a histogram of oriented gradient (HOG) instead of the motion vector. The pedestrian recognition process is similarly performed for both the captured forward image and rearward image. For example, the same dictionary information is used for both the forward image and rearward image.

The vehicle recognition process is a process for recognizing a vehicle as a recognition target. In the vehicle recognition process, the calculation section 12 extracts a target as in the pedestrian recognition process. Then, the calculation section 12 performs known pattern matching for the extracted target, and recognizes whether the type of the target is a vehicle. For example, in the vehicle recognition process, the calculation section 12 recognizes a vehicle by using dictionary information for vehicles. The vehicles may include not only four-wheel vehicles but also motorcycles and bicycles. It is noted that the vehicle recognition process is similarly performed for both the captured forward image and rearward image.

The obstacle recognition process is a process for recognizing an obstacle, other than a pedestrian and a vehicle, as a recognition target. The obstacle refers to a stationary object, for example, a construction such as a wall and a guardrail. In the obstacle recognition process, the calculation section 12 extracts, for example, characteristic points indicating presence of the obstacle from a captured image. Specifically, the calculation section 12 extracts edge points based on brightness information of the captured image. The calculation section 12 extracts the edge points based on change in brightness values in the scanning direction of the captured image. Specifically, the calculation section 12 scans the captured image in the right and left directions centering on the own vehicle to extract up-edge points whose brightness values rise by a predetermined value or more. The calculation section 12 may extract down-edge points whose brightness values fall by a predetermined value or more. The method of extracting edge points may be arbitrarily modified. For example, a Sobel filter may be applied to the captured image to extract edge points.

Then, the calculation section 12 performs a Hough transform for the extracted edge points. In the Hough transform, points on a straight line on which a plurality of edge points line up in a row, or points at which straight lines are orthogonal to each other are extracted as characteristic points. Then, the calculation section 12 recognizes the outline of the obstacle based on the characteristic points extracted from the captured image. It is noted that the obstacle recognition process is similarly performed for both the captured forward image and rearward image.

The lane marking recognition process is a process for recognizing a lane marking defining a lane as a recognition target. The lane markings include, for example, paint laid on a road surface such as a white line, road studs, and stones. In the lane marking recognition process, the calculation section 12 extracts characteristic points from the captured image as in the obstacle recognition process, and recognizes a lane marking based on the extracted characteristic points. Specifically, when the characteristic points line up in a line at predetermined distances, the calculation section 12 recognizes the line as a lane marking. It is noted that the lane marking recognition process is similarly performed for both the captured forward image and rearward image.

The road sign recognition process is a process for recognizing a road sign as a recognition target. In the road sign recognition process, the calculation section 12 recognizes the type of a road sign included in a forward image by, for example, pattern matching using previously stored dictionary information on road signs. The road sign refers to a sign board that is placed beside a road and provides necessary information to drivers and the like. The road signs indicate guidance, caution, regulations, instructions, and the like. The road signs include, for example, a road sign indicating a closed road, a road sign indicating that parking is allowed, and a road sign indicating a city, a town, or village. It is noted that since the necessity to recognize road signs behind a vehicle is low, the road sign recognition process is not included in the rearward recognition process.

When recognizing a pedestrian, a vehicle, or an obstacle, the calculation section 12 specifies information on a pedestrian, a vehicle, or an obstacle. Specifically, when recognizing a pedestrian, a vehicle, or an obstacle, the calculation section 12 calculates position information thereof. The position information is calculated based on an imaging angle, or a distance in a forward image or a rearward image and is indicated with coordinates. In this case, the magnitude and the width may be also specified. In addition, when the calculation section 12 has recognized a moving object such as a pedestrian or a vehicle as a target, the calculation section 12 calculates a speed and a traveling direction of the target based on change in the position information of the recognized target. Then, the calculation section 12 outputs the calculated information together with the recognition result by the recognition process.

Meanwhile, the recognition apparatus 10 is configured to receive forward image information and rearward image information and to be able to perform the forward recognition process and the rearward recognition process. For example, the recognition apparatus 10 integrated with the front camera 21 to perform the forward recognition process is configured to receive rearward image information from the rear camera 22 to perform the rearward recognition process. Hence, compared with a configuration in which a calculation section performing the rearward recognition process is provided separately from a calculation section performing the forward recognition process, the overall configuration of the recognition apparatus 100 can be simplified. In addition, since the forward recognition process and the rearward recognition process have many common processes, even if the calculation section 12 performing the forward recognition process is caused to perform the rearward recognition process, the calculation section 12 can perform the rearward recognition process without performance problems.

However, although if the forward recognition process and the rearward recognition process are separately performed, it causes no performance problems, if they are performed simultaneously, the processing load increases. In addition, considering that information on a periphery is required to be recognized based on a forward image when the vehicle moves forward and is required to be recognized based on a rearward image when the vehicle moves rearward, in principle, performing the rearward recognition process when the vehicle moves forward is wasteful. Similarly, performing the forward recognition process when the vehicle moves rearward is wasteful. Hence, to suppress increase in the processing load, the calculation section 12 performs the following image recognition process at predetermined intervals.

As shown in FIG. 2, the calculation section 12 acquires a captured image included in image information received by the input section 11 (step S101). Additionally, the calculation section 12 acquires information representing a shift position from the transmission 23 and acquires information representing a speed of the own vehicle from the vehicle speed sensor 24. The calculation section 12 functions as the acquisition section 13 by performing the step S101.

Next, the calculation section 12 determines whether the own vehicle is in a state of moving rearward, based on the information representing the acquired shift position (step S101). If the shift position is the R position, the calculation section 12 determines that the own vehicle is in the state of moving rearward. In contrast, if the 3o shift position is not the R position, that is, if the shift position is the D position, the N position, or the P position, the calculation section 12 determines that the own vehicle is not in the state of moving rearward.

If it is determined that the own vehicle is not in the state of moving rearward (step S102: No), the calculation section 12 determines whether the acquired speed of the own vehicle is a predetermined speed or more (step S103). It is desirable that the predetermined speed is too high for the vehicle to stop or move rearward after the stop. That is, it is desirable that the predetermined speed is set considering that if the acquired speed is less than the predetermined speed, the vehicle is likely to immediately stop or move rearward after the stop. For example, the predetermined speed is set to a value between approximately 5 to 15 km/h.

If the acquired speed is the predetermined speed or more (step S103: Yes), the calculation section 12 performs all processes of the forward recognition process (step S104). Specifically, the calculation section 12 selects and performs all the processes of the forward recognition process so as to recognize all the plurality types of recognition targets previously determined as recognition targets in the forward image. For example, the calculation section 12 selects and performs all of the pedestrian recognition process, the vehicle recognition process, the obstacle recognition process, the lane marking recognition process, and the road sign recognition process. That is, the calculation section 12 targets all of a pedestrian, a vehicle, an obstacle, a lane marking, and a road sign. Meanwhile, in step S104, the calculation section 12 does not perform the rearward recognition process. That is, when the vehicle is moving forward at a predetermined speed or more, the vehicle is unlikely to stop and to move backward, and the necessity to acquire peripheral information in an area behind the vehicle is low. Hence, the calculation section 12 does not select the processes of the forward recognition process. Accordingly, the calculation section 12 can perform the forward recognition process without increasing the processing load. Then, the image recognition process terminates.

In contrast, if the acquired speed is less than the predetermined speed (step S103: No), the calculation section 12 selects some processes among the processes performed as the forward recognition process, and performs the selected processes (step S105). That is, when a speed of the own vehicle is low or the vehicle is stopped in a state where the own vehicle is moving forward (in case of S105), the calculation section 12 selects processes so that the number of processes performed as the forward recognition process is decreased compared with a case where the speed of the own vehicle is high (in case of S104).

When performing step S105, the calculation section 12 distinguish the processes based on the type of a recognition target in each of the processes to select processes performed as the forward recognition process. The types of recognition targets are classified in advance. The calculation section 12 selects a process for recognizing recognition targets the types of which belong to classifications determined according to states of the vehicle (a shift position and a vehicle speed).

The types of recognition targets are classified with reference to, for example, whether the recognition targets move.

In addition, the types of recognition targets are classified with reference to whether the types of recognition targets are utilized (necessary) for a specific function included in a plurality of functions performed by the vehicle control unit 30 or the like. For example, in the present embodiment, a plurality of functions for controlling the vehicle (functions concerning driving support in the vehicle) are provided. The vehicle control unit 30 performs a function for collision detection included in the plurality of functions. Hence, the types of recognition targets are classified with reference to whether the types of recognition targets are utilized for collision detection.

Specifically, a pedestrian and a vehicle are classified as movable recognition targets. In contrast, an obstacle, a lane marking, and a road sign are classified as immovable recognition targets. In addition, a pedestrian, a vehicle, and an obstacle are classified as recognition targets utilized for collision detection. In contrast, a lane marking and a road sign are classified as recognition targets not utilized for collision detection.

In step S105, the calculation section 12 selects processes for recognizing a recognition target, which is classified as a recognition target utilized for collision detection, from the processes of the forward recognition process and performs the selected processes. That is, the calculation section 12 selects the pedestrian recognition process for recognizing a pedestrian as a recognition target, the vehicle recognition process for recognizing a vehicle as a recognition target, and the obstacle recognition process for recognizing an obstacle as a recognition target from the processes of the forward recognition process, and performs them. The reason why the lane marking recognition process and the road sign recognition process are not performed is that a target recognized by these processes is not utilized for the collision detection, that it is necessary to suppress increase in the processing load, and that since the target is at rest, when the vehicle is moving forward at less than a predetermined speed, it can be considered that the driver can easily recognize the target compared with a pedestrian or a vehicle.

After step S105 is performed, the calculation section 12 selects some processes among the processes performed as the rearward recognition process, and performs the selected processes (step S106). Thereafter, the image recognition process terminates. In step S106 (a case where the speed of the own vehicle is low while the own vehicle is moving forward, or a case where the own vehicle is stopped), the calculation section 12 selects processes so that the number of processes performed as the rearward recognition process easily increases compared with a case where the speed of the own vehicle is high (in case of S104). That is, although the rearward recognition process is not performed at all in step S104, part of the rearward recognition process is performed in step S106 to increase the number of processes performed as the rearward recognition process.

In this case, the calculation section 12 selects, among the processes performed as the rearward recognition process, processes for recognizing a recognition target that is classified in a moving recognition target and classified in a recognition target utilized for collision detection. Specifically, the calculation section 12 selects and performs the pedestrian recognition process for recognizing a pedestrian as a recognition target and the vehicle recognition process for recognizing a vehicle as a recognition target.

The reason why processes for recognizing a recognition target utilized for collision detection are selected among the processes of the rearward recognition process, while the vehicle is moving forward at less than a predetermined speed or is stopped, is that the recognition target is utilized for collision detection performed by the vehicle control unit 30. The reason why processes for recognizing a moving recognition target are selected is that even when the vehicle is moving forward at less than a predetermined speed or is stopped, the moving recognition target may collide with the rear of the vehicle. In contrast, the reason why processes for recognizing a recognition target that is not moving are not selected is that when the vehicle is moving forward at less than a predetermined speed or is stopped, a stationary object is less likely to collide with the rear of the vehicle.

If it is determined that the own vehicle is in a state of moving rearward (step S102: Yes), the calculation section 12 performs all the processes of the rearward recognition process (step S107). Specifically, the calculation section 12 selects and performs all the processes of the rearward recognition process so as to recognize all the plurality types of recognition targets previously determined as recognition targets in the rearward images. For example, the calculation section 12 selects and performs all of the pedestrian recognition process, the vehicle recognition process, the obstacle recognition process, and the lane marking recognition process. That is, the calculation section 12 targets all of a pedestrian, a vehicle, an obstacle, and a lane marking in the rearward images. Meanwhile, in step S107, the calculation section 12 does not perform the forward recognition process. Then, the image recognition process terminates.

As described above, by performing steps S104 to S107, the calculation section 12 functions as the process selection section 14 that selects processes performed as the forward recognition process and the rearward recognition process, based on information acquired by the acquisition section 13.

In the present embodiment, when it is determined that the own vehicle is in a state of moving rearward, the processes of the forward recognition process are not performed at all. However, some of the processes of the forward recognition process may be selected and performed. For example, out of the processes of the forward recognition process, the pedestrian recognition process and the vehicle recognition process may be performed to recognize a pedestrian and a vehicle.

When recognizing information on a periphery (information concerning a recognition target) by the image recognition process, the recognition apparatus 10 outputs the recognized information on a periphery to the vehicle control unit 30.

Next, the control for causing the display unit 25 to display a captured image will be described. The calculation section 12 functions as the display control section 15 that controls the common display unit 25 so as to display a forward image and a rearward image. Hence, the overall configuration of the system can be simplified compared with a configuration in which sets of the calculation section 12 and the display unit 25 are respectively provided for forward images and rearward images. In addition, since the process for displaying a forward image and the process for displaying a rearward image include a lot of common processes, even if the calculation section 12 causing the display unit to display a forward image is caused to perform control for causing the display unit to display a rearward image, no performance problem arises.

However, if a forward image and a rearward image are displayed simultaneously, the processing load increases. In addition, considering that when the vehicle is moving forward, a forward image is necessary to be viewed, and that when the vehicle is moving rearward, a rearward image is necessary to be viewed, in principle, displaying the rearward image when the vehicle moves forward is wasteful. Similarly, displaying the forward image when the vehicle moves rearward is wasteful. Hence, to suppress the increase in the processing load, the following image recognition process is performed at predetermined intervals.

As shown in FIG. 3, the calculation section 12 acquires a captured image included in received image information (step s201). Additionally, the calculation section 12 acquires information representing a shift position from the transmission 23, and acquires information representing a speed of the own vehicle form the vehicle speed sensor 24. Next, the calculation section 12 determines whether the own vehicle is in a state of moving rearward, based on the acquired shift position (step S202).

If it is determined that the own vehicle is not in the state of moving rearward (step S202: No), the calculation section 12 determines whether the acquired speed of the own vehicle is a predetermined speed (a value between approximately 5 to 15 km/h) or more (step S203).

If the acquired speed is the predetermined speed or more (step S203: Yes), the calculation section 12 controls the display unit 25 so as to display the whole forward image (step S204). Then, the image display process terminates.

In contrast, if the acquired speed is less than the predetermined speed (step S203: No), the calculation section 12 controls the display unit 25 so as to omit part of the forward image and display the remaining forward image (step S205). Specifically, when the own vehicle is moving forward at less than a predetermined speed, the calculation section 12 omits image parts that are less necessary to be viewed. For example, an upper image of the forward image, that is, an image of a far area is omitted because the image is less necessary when the own vehicle is moving forward at less than the predetermined speed.

Then, the calculation section 12 controls the display unit 25 so as to display part of the rearward image (step S206). Then, the image display process terminates. In step S206, the display control section 15 causes the display unit 25 to display an image of an area in the vicinity of the own vehicle included in the rearward image. The image of an area in the vicinity of the own vehicle is an image that is desirable to be viewed when the vehicle moves rearward, and is, for example, an image of an area within a range of 8 m from the vehicle. It is noted that the rearward image may be omitted by being reduced.

In contrast, if it is determined that the own vehicle is in the state of moving rearward (step S202: Yes), the calculation section 12 controls the display unit 25 so as to display the whole rearward image (step S207). Then, the image display process terminates. It is noted that, in the present embodiment, even when it is determined that the own vehicle is in the state of moving rearward, part of the forward image may be displayed.

Next, relationships between states of the own vehicle and manners of performing the recognition process will be described with reference to FIGS. 4A-4D.

When the shift position is the D position, and the speed of the own vehicle acquired by the vehicle speed sensor 24 is a predetermined speed or more (period T1), the calculation section 12 performs all of the processes of the forward recognition process. That is, the calculation section 12 performs the pedestrian recognition process, the vehicle recognition process, the obstacle recognition process, the lane marking recognition process, and the road sign recognition process. However, the calculation section 12 does not perform the rearward recognition process. That is, the calculation section 12 sets the amount of processing of the rearward recognition process to zero during period T1.

When the shift position is the D position, and the speed of the own vehicle acquired by the vehicle speed sensor 24 is less than the predetermined speed (period T2), the calculation section 12 selects and performs some processes of the processes of the forward recognition process. That is, the calculation section 12 selects and performs the pedestrian recognition process, the vehicle recognition process, and the obstacle recognition process of the forward recognition process. However, the calculation section 12 does not perform the lane marking recognition process and the road sign recognition process of the forward recognition process. That is, the calculation section 12 decreases the amount of processing of the forward recognition process during period T2 so as to be less than that during period T1.

In addition, during period T2, the calculation section 12 selects and performs some processes of the processes of the rearward recognition process. That is, the calculation section 12 performs the pedestrian recognition process and the vehicle recognition process of the rearward recognition process. However, the calculation section 12 does not perform the obstacle recognition process, the lane marking recognition process, and the road sign recognition process of the rearward recognition process. That is, the calculation section 12 increases the amount of processing of the rearward recognition process during period T2 so as to be more than that during period T1.

As described above, the calculation section 12 changes execution rates of the forward recognition process and the rearward recognition process according to a traveling condition. That is, there is a case where, during the same state where the vehicle is moving forward, the calculation section 12 decreases an execution rate of the forward recognition process and increases an execution rate of the rearward recognition process according to the traveling condition. There is also a case where, during the same state where the vehicle is moving forward, the calculation section 12 increases execution rate of the forward recognition process and decreases an execution rate of the rearward recognition process. Accordingly, even if both the forward recognition process and the rearward recognition process are performed, the processing load does not increase.

When the shift position is in a state of indicating moving rearward (period T3), the calculation section 12 performs all the processes of the rearward recognition process. That is, the calculation section 12 performs the pedestrian recognition process, the vehicle recognition process, the obstacle recognition process, and the lane marking recognition process. That is, the calculation section 12 increases the amount of processing of the rearward recognition process during period T3 so as to be more than those during period T1 and period T2.

However, the calculation section 12 does not perform the forward recognition process. The calculation section 12 sets the amount of processing of the forward recognition process to zero during period T3. That is, the calculation section 12 decreases the amount of processing of the forward recognition process during period T3 so as to be less than those during period T1 and period T2.

As described above, the calculation section 12 changes execution rates of the forward recognition process and the rearward recognition process according to whether the own vehicle is in a state of moving rearward. That is, during a state where the vehicle is moving rearward, the calculation section 12 decreases the execution rate of the forward recognition process and increases the execution rate of the rearward recognition process. In contrast, during a state where the vehicle is moving forward, the calculation section 12 increases the execution rate of the forward recognition process and decreases the execution rate of the rearward recognition process. Accordingly, the processing load does not increase.

The above configuration provides the following effects.

Considering that information on a periphery is required to be recognized based on a forward image when the own vehicle moves forward and is required to be recognized based on a rearward image when the own vehicle moves rearward, it is necessary for the calculation section 12 of the recognition apparatus 10 to perform the forward recognition process when the own vehicle moves forward and to perform the rearward recognition process when the own vehicle moves rearward. However, in certain traveling conditions of the own vehicle, it is desirable that the rearward recognition process is also performed when the own vehicle moves forward, and conversely, the forward recognition process is also performed when the own vehicle moves rearward.

Hence, the calculation section 12 selects processes performed as the forward recognition process and processes performed as the rearward recognition process based on information representing whether the own vehicle is in a state of moving forward or a state of moving rearward and information representing a traveling condition of the own vehicle. That is, the calculation section 12 selects processes performed as the forward recognition process and processes performed as the rearward recognition process based on a shift position and a vehicle speed and performs the selected processes. Accordingly, the calculation section 12 can appropriately perform the recognition process to recognize appropriate information according to the traveling condition. In addition, since the calculation section 12 performs the forward recognition process and the rearward recognition process, the configuration of the recognition apparatus 100 can be simplified compared with a case where two calculation sections are separately provided.

Even when the own vehicle is moving forward, if the speed is less than a predetermined speed, the own vehicle may stop and change to moving rearward. Hence, when the own vehicle is in a state where the own vehicle is moving forward and the speed of the own vehicle is low, the calculation section 12 increases the number of processes performed as the rearward recognition process compared with a case where the speed of the own vehicle is high. Accordingly, even when the own vehicle is stopped and changes to moving rearward, the vehicle control can be performed based on the peripheral information in an area behind the vehicle.

In addition, when the own vehicle is in a state where the vehicle is moving forward and the speed of the own vehicle is low, the calculation section 12 decreases the number of processes performed as the forward recognition process compared with a case where the speed of the own vehicle is high. Accordingly, even when the number of processes performed as the rearward recognition process is increased, increase in the processing load can be suppressed.

In the forward recognition process and the rearward recognition process, the calculation section 12 recognizes a predetermined plurality of types of recognition targets. In addition, processes for recognizing each type of the recognition target are previously determined. Hence, the calculation section 12 selects processes for recognizing some recognition targets among the plurality types of recognition targets based on a shift position and a vehicle speed. Accordingly, appropriate recognition targets can be recognized according to states of the vehicle.

A moving recognition target is difficult to recognize for a driver and is likely to collide with the own vehicle compared with a recognition target at rest. In particular, when the own vehicle is moving forward at less than a predetermined speed or is stopped, while the own vehicle is likely to collide with a recognition target moving behind the own vehicle, the own vehicle is not likely to collide with a recognition target at rest behind the own vehicle. In addition, a moving recognition target requires, unlike a recognition target at rest, a certain amount of time for predicting a course. Hence, recognition targets are classified based on whether the recognition targets are moving, and the calculation section 12 selects processes for recognizing moving recognition targets in priority to processes for recognizing recognition targets at rest.

Accordingly, whether an object is regarded as a recognition target can be appropriately determined according to a probability of a collision. For example, when the own vehicle is moving forward at less than a predetermined speed or is stopped, the calculation section 12 can select processes for recognizing a pedestrian and a vehicle behind the own vehicle as recognition targets. In contrast, the calculation section 12 may not select a process for recognizing an obstacle behind the own vehicle as a recognition target. Accordingly, the calculation section 12 can recognize an appropriate recognition target according to a traveling condition. Alternatively, the process by which unnecessary recognition targets are recognized are not selected, whereby the amount of processing can be decreased, which can suppress increase in the processing load.

Recognition targets are classified based on whether the recognition targets are utilized for determining a collision, and the calculation section 12 selects processes for recognizing a recognition target utilized for determining a collision in priority to processes for recognizing a recognition target that is not utilized. Accordingly, a recognition target (information on a periphery) utilized for determining a collision can be recognized. On the other hand, since processes for recognizing a recognition target that is not utilized are not performed, increase in the processing load can be suppressed.

Commonality is provided between the pedestrian recognition process included in the forward recognition process and the pedestrian recognition process included in the rearward recognition process. That is, the calculation section 12 uses dictionary information, which is used in the pedestrian recognition process included in the forward recognition process, also in the pedestrian recognition process included in the rearward recognition process. Accordingly, the amount of storage can be decreased compared with a case where two pieces of dictionary information are separately stored. The same applies to the vehicle recognition process and the road sign recognition process.

Considering that when the vehicle is moving forward, it is necessary to view an area ahead of the vehicle, and that when the vehicle is moving rearward, it is necessary to view an area behind the vehicle, a forward image is required to be displayed when the vehicle is moving forward, and a rearward image is required to be displayed when the vehicle is moving rearward. However, in certain traveling conditions of the own vehicle, it is desirable that the rearward image can be also viewed when the own vehicle moves forward, and that conversely, the forward image can be also viewed when the own vehicle moves rearward.

Hence, in certain traveling conditions of the own vehicle, the calculation section 12 performs control so that both the forward image and the rearward image are displayed together. In this case, part of at least one of the forward image and the rearward image is omitted. Specifically, when the own vehicle moves forward, and if the speed of the own vehicle is less than a predetermined speed, the calculation section 12 omits part of the forward image and displays the remaining forward image, and displays part of the rearward image.

Second Embodiment

The recognition apparatus 10 according to the second embodiment will be described with reference to FIGS. 5A-5D. FIGS. 5A-5D illustrate relationships between states the own vehicle and manners of performing the recognition process.

When the shift position is the D position, if the speed of the own vehicle acquired by the vehicle speed sensor 24 is a predetermined speed α or more (period U1), the calculation section 12 performs all the processes of the forward recognition process. That is, the calculation section 12 performs the pedestrian recognition process, the vehicle recognition process, the lane marking recognition process, and the road sign recognition process. On the other hand, during period U1, the calculation section 12 suppresses the amount of processing of the rearward recognition process so as to be lower than that in normal time (when the shift position indicates moving rearward). Specifically, during period U1, the calculation section 12 performs only part of the rearward recognition process (e.g., minimal processes to be performed) to suppress the amount of processing. In this case, the amount of processing of the rearward recognition process may be zero.

When the shift position is the D position, if the speed of the own vehicle acquired by the vehicle speed sensor 24 is less than a predetermined speed α (period U2), the calculation section 12 selects and performs some processes of the rearward recognition process. For example, the calculation section 12 performs the pedestrian recognition process and the vehicle recognition process, and does not perform the lane marking recognition process and the road sign recognition process. That is, the calculation section 12 increases the amount of processing of the rearward recognition process during period U2 so as to be more than that during period U1. During period U2, the calculation section 12 performs all the processes of the forward recognition process.

As described above, the calculation section 12 changes execution rates of the forward recognition process and the rearward recognition process according to a traveling condition. Specifically, the calculation section 12 changes the execution rate of the rearward recognition process according to the traveling condition. Accordingly, not performing some processes of the rearward recognition process can suppress the processing load compared with a case where all the processes of the forward recognition process and the rearward recognition process are performed.

When the shift position indicates a state of moving rearward, if the speed of the own vehicle acquired by the vehicle speed sensor 24 is a predetermined speed β or more (period U3), the calculation section 12 selects and performs some processes of the forward recognition process. For example, the calculation section 12 performs the pedestrian recognition process and the vehicle recognition process included in the plurality of processes of the forward recognition process, and does not perform the lane marking recognition process and the road sign recognition process. That is, the calculation section 12 decreases the amount of processing of the forward recognition process during period U3 so as to be less than those during period U1 and period U2 (when the shift position indicates moving forward).

During period U3, the calculation section 12 performs all the processes of the rearward recognition process. That is, the calculation section 12 increases the amount of processing of the rearward recognition process during period U3 so as to be more than those during period U1 and period U2 (when the shift position indicates moving forward). It is noted, in FIGS. 5A-5D, in a case of indicating moving rearward, the speed of the own vehicle moving rearward is indicated by a minus sign, and a negative value become greater in proportion to the speed of the vehicle moving rearward.

When the shift position indicates a state of moving rearward, if the speed of the own vehicle acquired by the vehicle speed sensor 24 is less than the predetermined speed β (period U4), the calculation section 12 performs all the processes of the rearward recognition process. That is, the calculation section 12 increases the amount of processing of the rearward recognition process during period U4 so as to be more than those during period U1 and period U2 (when the shift position indicates moving forward). It is noted, in a case where the shift position indicates moving rearward, the speed of the own vehicle moving rearward is indicated by a minus sign. Hence, the speed less than the predetermined speed β indicates that the speed of the own vehicle itself is higher than that when the speed is the predetermined speed β or more (indicating that the absolute value is larger).

On the other hand, during period U4, the calculation section 12 suppresses the amount of processing of the forward recognition process. Specifically, during period U4, the calculation section 12 performs only some of the plurality of processes included in the forward recognition process (e.g., only minimal processes to be performed) to suppress the amount of processing. The calculation section 12 may set the amount of processing of the forward recognition process to zero. That is, the calculation section 12 decreases the amount of processing of the forward recognition process during period T4 so as to be less than those during period U1 and period U2 (when the shift position indicates moving forward). In addition, the calculation section 12 decreases the amount of processing of the forward recognition process during period T4 so as to be less than that during period U3.

Thereafter, When the shift position is in a state of indicating moving rearward, if the speed of the own vehicle acquired by the vehicle speed sensor 24 is the predetermined speed β or more (period U5), the calculation section 12 selects and performs some processes of the forward recognition process and performs all the processes of the rearward recognition process, as during period U3.

Thereafter, the shift position is changed from the state of indicating moving rearward to the D position. If the speed of the own vehicle acquired by the vehicle speed sensor 24 is less than the predetermined speed α (period U6), the calculation section 12 performs all the processes of the forward recognition process and selects and performs some processes of the rearward recognition process, as during period U2.

After the shift position is changed to the D position, if the speed of the own vehicle becomes the predetermined speed α or more (period U7), the calculation section 12 performs all the processes of the forward recognition process, and suppresses the amount of processing of the rearward recognition process, as during period U1.

As described above, the calculation section 12 changes execution rates of the forward recognition process and the rearward recognition process according to whether the own vehicle is in a state of moving rearward. That is, during the state where the vehicle is moving rearward, the calculation section 12 decreases the execution rate of the forward recognition process and increases the execution rate of the rearward recognition process. In contrast, during a state where the vehicle is moving forward, the calculation section 12 increases the execution rate of the forward recognition process and decreases the execution rate of the rearward recognition process. Accordingly, the processing load does not increase. In addition, before the shift position is changed, necessary recognition processes are performed, whereby after the shift position is changed, the control based on the recognition can be immediately performed.

OTHER EMBODIMENTS

The present disclosure is not limited to the above embodiments, and may be implemented, for example, as below. It is noted that the same or equivalent components are denoted by the same reference signs, and redundant descriptions for the components denoted by the same reference signs are omitted.

When the own vehicle is moving forward, and the speed of the own vehicle is lower than a predetermined speed (a value between approximately 5 to 15 km/h), it is likely that the vehicle decelerates, then stops according to the decrease in speed, and thereafter moves rearward. Hence, when the own vehicle is moving forward and if the speed of the own vehicle is less than a predetermined speed, as the speed of the own vehicle decreases, the calculation section 12 may decrease the number of processes performed in the forward recognition process, and increase the number of processes performed in the rearward recognition process.

For example, if the speed is 15 km/h or less, the calculation section 12 may select the pedestrian recognition process, the vehicle recognition process, and the obstacle recognition process of the forward recognition process. If the speed is 5 km/h or less, the calculation section 12 may select the pedestrian recognition process and the lane marking recognition process of the forward recognition process. In addition, if the speed is 15 km/h or less, the calculation section 12 may select the pedestrian recognition process and the vehicle recognition process of the rearward recognition process. If the speed is 5 km/h or less, the calculation section 12 may select the pedestrian recognition process, the vehicle recognition process, and the obstacle recognition process of the rearward recognition process.

Accordingly, as the probability of moving rearward increases, the amount of peripheral information on a recognition target behind the own vehicle can be larger. Even such a case, since the number of processes selected from the forward recognition process is decreased as the speed of the own vehicle decreases, increase in the processing load can be suppressed.

When the speed of the own vehicle is low, the degree of importance (utility value) of the information in an area in the vicinity of the own vehicle is higher than that of the information in an area far from the own vehicle, and is easily used for various functions. Hence, when the own vehicle is moving forward at less than a predetermined speed, the calculation section 12 may classify recognition targets according to distances to preferentially select processes for recognizing the recognition target in the vicinity of the own vehicle. In this case, for example, the calculation section 12 may classify recognition targets according to distances on a captured image. Specifically, the calculation section 12 may perform processes for recognizing a recognition target based on a lower half image of the captured image or based on an image within a predetermined range centering on the own vehicle. Accordingly, increase in the processing load can be suppressed. It is noted that the area in the vicinity of the own vehicle is required to be recognized when the own vehicle is parked or stopped or when the own vehicle changes the traveling direction, and is, for example, an area within approximately 10 m from the vehicle.

The recognition apparatus 10 may combine (fusion) radar information acquired from a radar such as a millimeter-wave radar and information based on the captured image to improve accuracy of position information or the like. That is, information having higher accuracy between the information based on the captured image and the radar information may be used to improve positional accuracy, accuracy of relative speed, and the like. The radar transmits, for example, a high frequency signal in a millimeter wave band, as a probe wave, to detect the position of a target based on a reflected wave from the target.

The calculation section 12 as the display control section 15 may apply predetermined processing to a captured image to be displayed. For example, to a rearward image, auxiliary lines indicating the width of the own vehicle or the position of the own vehicle predicted based on a steering angle, or auxiliary lines indicating a parking area may be added. In addition, to a forward image, an image representing a pedestrian or a vehicle to provide notification may be added.

In the case where the processing is performed as described above, while the own vehicle is moving forward at less than a predetermined speed, if part of the forward image is displayed, part or the whole of the processing performed for the forward image may be omitted. Similarly, while the own vehicle is moving forward at less than the predetermined speed, if part of the rearward image is displayed, part or the whole of the processing performed for the rearward image may be omitted. Accordingly, increase in the processing load can be suppressed.

In the above embodiment, information representing a place where the vehicle travels may be acquired as the traveling condition. For example, in a parking area, a vehicle is likely to stop or move rearward. In addition, in a parking area, unlike a road on which vehicles travel, the traveling direction of a vehicle easily becomes irregular, and the own vehicle is likely to be struck from behind. Hence, even in a state where the own vehicle is moving forward, when information representing a parking area is acquired, processes of the rearward recognition process are selected and performed. Accordingly, even when the own vehicle is moving forward, peripheral information in an area behind the own vehicle desirable to be recognized when the own vehicle stops and then moves rearward can be recognized. It is noted that the information representing the place where the vehicle travels can be acquired from a road sign, a road marking, a navigation system, and the like. When the place where the vehicle travels is on a road, the calculation section 12 may not perform the rearward recognition process.

In the above embodiments, information on a condition of turn indicators may be acquired as the traveling condition. For example, when the turn indicators are in a lit state and the own vehicle is moving forward, the calculation section 12 may select and perform processes of the rearward recognition process. When the turn indicators are in a lit state, since the own vehicle is likely to turn right or left or change a lane, it is desirable that peripheral information in an area behind the own vehicle is recognized. Hence, according to the above configuration, even when the own vehicle is moving forward, the peripheral information in an area behind the own vehicle required when the own vehicle turns right or left or changes a lane can be recognized.

In the above embodiments, the types of recognition targets selected by the calculation section 12 may be arbitrarily changed. For example, processes may be selected so that one type of recognition target is recognized or two or more types of recognition targets are recognized. The types of recognition targets to be selected may be changed according to the conditions based on the processing load and whether the recognition targets are utilized (or whether the recognition targets are likely to be utilized).

The types of recognition targets may be classified with reference to whether the driver can easily recognize them. Specifically, types of recognition targets may be classified with reference to sizes and widths thereof. When selecting processes of the forward recognition process or the rearward recognition process, the calculation section 12 may preferentially select the process for recognizing a recognition target that the driver is difficult to recognize.

In the above embodiments, the vehicle control unit 30 may include an ACC (Adaptive Cruise Control) function to cause the own vehicle to perform following travel so that the distance to a detected vehicle becomes a target value of an inter-vehicular distance according to the vehicle speed. Specifically, the vehicle control unit 30 is connected with a transmission, a throttle motor, and a throttle sensor via a dedicated line of, for example, serial communication. The vehicle control unit 30 determines an acceleration of the own vehicle based on information on the vehicle to be followed (an inter-vehicular distance and a relative speed). The vehicle control unit 30 controls the throttle motor while monitoring a throttle position detected by the throttle sensor. For example, the vehicle control unit 30 determines a throttle position according to the determined acceleration and a current vehicle speed based on a table in which vehicle speeds and accelerations are associated with throttle positions. In addition, the vehicle control unit 30 determines the necessity of changing a gear position based on the vehicle speed and the throttle position and indicates the gear position to the transmission as needed. Accordingly, the ACC function is implemented.

If the above ACC function is being performed, the calculation section 12 may preferentially select the vehicle recognition process of the forward recognition process when selecting processes from the processes of the forward recognition process. On the other hand, since the ACC function is effective only when the own vehicle moves forward, the calculation section 12 may not select the vehicle recognition process of the rearward recognition process when selecting processes from the processes of the rearward recognition process. For example, when the own vehicle moves forward, and the ACC function is being performed, the calculation section 12 may necessarily perform the vehicle recognition process.

In the above embodiments, the vehicle control unit 30 may include a lane keeping assist function to support driving so that the own vehicle travels along a lane marking. Specifically, the vehicle control unit 30 performs vehicle control based on the lane marking so that the lane marking and the traveling direction of the own vehicle form a predetermined angle, and that the distance between the lane marking and the own vehicle is within a predetermined range. For example, the vehicle control unit 30 adjusts a steering angle. When the own vehicle does not travel along the lane marking, outputs a warning sound to implement the lane keeping assist function.

If the above lane keeping assist function is performed, the calculation section 12 may preferentially select the lane marking recognition process of the forward recognition process when selecting processes from the processes of the forward recognition process. On the other hand, since the lane keeping assist function is effective only when the own vehicle moves forward, the calculation section 12 may not select the lane marking recognition process of the rearward recognition process when selecting processes from the processes of the rearward recognition process. For example, when the own vehicle moves forward at less than a predetermined speed, and the lane keeping assist function is being performed, the calculation section 12 may necessarily perform the lane marking recognition process of the forward vehicle recognition process.

In the above embodiments, the vehicle control unit 30 may include a parking assist function for automatically parking the own vehicle at a parking position. Specifically, when the parking assist function is performed, the vehicle control unit 30 may recognize a space where the own vehicle can be parked, based on the position of an obstacle recognized by the obstacle recognition process, and guide the own vehicle or support driving so that the own vehicle is parked in the space.

When the parking assist function is being performed, the calculation section 12 may preferentially select the obstacle recognition process when selecting processes from the processes of the forward recognition process or the processes of the rearward recognition process. That is, when the parking assist function is being performed, the calculation section 12 may necessarily select and perform the obstacle recognition process.

In the above embodiments, the vehicle control unit 30 may include a notification function of providing road information based on a recognized road sign. When the notification function is being performed, the calculation section 12 may preferentially select and perform the road sign recognition process targeting the recognition target.

In the above embodiments, although the recognition apparatus 10 is integrated with the front camera 21, the recognition apparatus 10 may be integrated with the rear camera 22. The recognition apparatus 10 may be separated from the front camera 21.

In the above embodiments, when the own vehicle is moving forward at a predetermined speed or more, the calculation section 12 causes the whole forward recognition process to be performed, and causes the whole forward image to be displayed. However, the timing at which the whole forward recognition process is performed and the timing at which the whole forward image is displayed may be different from each other. For example, when the own vehicle is moving forward at a first speed or more, the calculation section 12 may cause the whole forward recognition process to be performed. When the own vehicle is moving forward at equal to or more than a second speed higher than the first speed, the calculation section 12 may cause the whole forward image to be displayed.

In the above embodiments, the calculation section 12 may omit performing part or the whole of the image display process concerning the display control according to states of the vehicle to suppress increase in the processing load. That is, when causing the rearward recognition process and the forward recognition process to be performed, the calculation section 12 may not cause images to be displayed to suppress increase in the processing load.

Processes of the forward recognition process and the rearward recognition process selected and performed according to states of the vehicle (a shift position and a vehicle speed) may be previously determined and stored. The types of recognition targets may be previously determined and stored according to states of the vehicle (a shift position and a vehicle speed). In this case, processes for recognizing a recognition target the type of which is according to the states of the vehicle (a shift position and a vehicle speed) may be selected.

When the processing load (or the amount of processing) is larger than a previously determined load, processes of the forward recognition process and the rearward recognition process to be performed may be selected. In this case, the calculation section 12 may preferentially select a process for recognizing a moving recognition target, or may preferentially select a process for recognizing a recognition target in the vicinity of the vehicle.

The recognition apparatus 10 may include various functions (the collision detection section 31 and the vehicle control section 32) included in the vehicle control unit 30.

Although the present disclosure is described based on the embodiments, the present disclosure is not limited to the embodiments and structures thereof. The present disclosure includes various modified examples and modifications within an equivalent range. In addition, various combinations and forms, and other various combinations and forms further including one or more or less element are also included in the scope and the spirit of the present disclosure.

As an aspect of the present disclosure, a recognition apparatus (10) is provided which includes: an input section (11) that receives image information from a front camera (21) and a rear camera (22); and a calculation section (12) that performs a forward recognition process that is a recognition process targeting the image information from the front camera received by the input section and a rearward recognition process that is a recognition process targeting the image information from the rear camera received by the input section. The calculation section includes: an acquisition section (13) that acquires first information representing whether an own vehicle is in a state of moving forward or a state of moving rearward and second information representing a traveling condition of the own vehicle; and a process selection section (14) that selects processes to be performed as the forward recognition process and the rearward recognition process, based on the first and second information acquired by the acquisition section.

Considering that information on a periphery is required to be recognized based on a forward image when a vehicle moves forward and is required to be recognized based on a rearward image when the vehicle moves rearward, it is necessary to perform the forward recognition process when the vehicle moves forward and to perform the rearward recognition process when the vehicle moves rearward.

However, in certain traveling conditions of the own vehicle, it is desirable that the rearward recognition process is also performed when the own vehicle moves forward, and that conversely, the forward recognition process is also performed when the own vehicle moves rearward. Hence, processes performed as the forward recognition process and processes performed as the rearward recognition process are selected based on information representing whether the own vehicle is in a state of moving forward or a state of moving rearward and information representing a traveling condition of the own vehicle. Accordingly, more appropriate information can be recognized. In addition, since the calculation section can perform the forward recognition process and the rearward recognition process, the configuration can be simplified compared with a case where two calculation sections are separately provided.

What is claimed is:

1. A recognition apparatus, comprising:
   an input section that receives image information from a front camera and a rear camera; and
   a calculation section that performs a forward recognition process that is a recognition process targeting the image information from the front camera received by the input section and a rearward recognition process that is a recognition process targeting the image information from the rear camera received by the input section, wherein
   the calculation section includes:
   an acquisition section that acquires first information representing whether an own vehicle is in a state of moving forward or a state of moving rearward and second information representing a traveling condition of the own vehicle; and
   a process selection section that selects processes to be performed as the forward recognition process and the rearward recognition process, based on the first and second information acquired by the acquisition section, wherein
   the acquisition section acquires information representing a speed of the own vehicle as the information representing the traveling condition, and
   in a case where the speed of the own vehicle is low while the own vehicle is moving forward, the process selection section increases a number of the processes to be performed as the rearward recognition process compared with a case where the speed of the own vehicle is high.

2. The recognition apparatus according to claim 1, wherein
   the calculation section recognizes a predetermined plurality types of recognition targets based on the image information, and
   the process selection section selects a process for recognizing a recognition target included in the plurality types of recognition targets among processes included in the forward recognition process and the rearward recognition process, based on the information acquired by the acquisition section.

3. The recognition apparatus according to claim 2, wherein
   the recognition targets are classified with reference to whether the recognition targets are moving, and
   the process selection section selects a process for recognizing a recognition target that is moving in priority to a process for recognizing a recognition target that is not moving.

4. The recognition apparatus according to claim 2, wherein
   the recognition targets are classified with reference to distances from the own vehicle, and
   the process selection section selects a process for recognizing a recognition target whose distance from the own vehicle is short in priority to a process for recognizing a recognition target whose distance from the own vehicle is long.

5. The recognition apparatus according to claim 1, wherein the calculation section recognizes a recognition target by pattern matching based on dictionary information that is previously stored, and in the forward recognition process and the rearward recognition process, a recognition target ahead of the own vehicle and a recognition target behind the own vehicle are recognized by using the same dictionary information.

6. The recognition apparatus according to claim 1, wherein the calculation section includes an acquisition section that causes a display unit to display at least one of a forward image captured by the front camera and a rearward image captured by the rear camera, the display unit determines an image to be displayed based on information representing whether the own vehicle is in a state of moving forward or a state of moving rearward and information representing the traveling condition of the own vehicle, and in a case where the forward image and the rearward image are displayed together, part of the forward image and part of the rearward image are displayed.

7. The recognition apparatus according to claim 1, wherein the speed of the own vehicle is low for a state in which the speed of the own vehicle is less than a predetermined speed, and the speed of the own vehicle is high for a state in which the speed of the own vehicle is greater than the predetermined speed.

8. A recognition apparatus, comprising:

an input section that receives image information from a front camera and a rear camera; and a calculation section that performs a forward recognition process that is a recognition process targeting the image information from the front camera received by the input section and a rearward recognition process that is a recognition process targeting the image information from the rear camera received by the input section, wherein the calculation section includes:

an acquisition section that acquires first information representing whether an own vehicle is in a state of moving forward or a state of moving rearward and second information representing a traveling condition of the own vehicle; and a process selection section that selects processes to be performed as the forward recognition process and the rearward recognition process, based on the first and second information acquired by the acquisition section, wherein the acquisition section acquires information representing a speed of the own vehicle as the information representing the traveling condition, and in a case where the speed of the own vehicle is low while the own vehicle is moving forward, the process selection section decreases a number of processes to be performed as the forward recognition process compared with a case where the speed of the own vehicle is high.

9. The recognition apparatus according to claim 8, wherein the speed of the own vehicle is low for a state in which the speed of the own vehicle is less than a predetermined speed, and the speed of the own vehicle is high for a state in which the speed of the own vehicle is greater than the predetermined speed.

10. The recognition apparatus according to claim 8, wherein the calculation section recognizes a predetermined plurality types of recognition targets based on the image information, and the process selection section selects a process for recognizing a recognition target included in the plurality types of recognition targets among processes included in the forward recognition process and the rearward recognition process, based on the information acquired by the acquisition section.

11. The recognition apparatus according to claim 10, wherein the recognition targets are classified with reference to whether the recognition targets are moving, and the process selection section selects a process for recognizing a recognition target that is moving in priority to a process for recognizing a recognition target that is not moving.

12. The recognition apparatus according to claim 10, wherein the recognition targets are classified with reference to distances from the own vehicle, and the process selection section selects a process for recognizing a recognition target whose distance from the own vehicle is short in priority to a process for recognizing a recognition target whose distance from the own vehicle is long.

13. The recognition apparatus according to claim 8, wherein the calculation section recognizes a recognition target by pattern matching based on dictionary information that is previously stored, and in the forward recognition process and the rearward recognition process, a recognition target ahead of the own vehicle and a recognition target behind the own vehicle are recognized by using the same dictionary information.

14. The recognition apparatus according to claim 8, wherein the calculation section includes an acquisition section that causes a display unit to display at least one of a forward image captured by the front camera and a rearward image captured by the rear camera, the display unit determines an image to be displayed based on information representing whether the own vehicle is in a state of moving forward or a state of moving rearward and information representing the traveling condition of the own vehicle, and in a case where the forward image and the rearward image are displayed together, part of the forward image and part of the rearward image are displayed.

15. A recognition apparatus, comprising:

an input section that receives image information from a front camera and a rear camera; and a calculation section that performs a forward recognition process that is a recognition process targeting the image information from the front camera received by the input section and a rearward recognition process that is a recognition process targeting the image information from the rear camera received by the input section, wherein the calculation section includes:

an acquisition section that acquires first information representing whether an own vehicle is in a state of moving forward or a state of moving rearward and second information representing a traveling condition of the own vehicle; and a process selection section that selects processes to be performed as the forward recognition process and the rearward recognition process, based on the first and second information acquired by the acquisition section, wherein the acquisition section acquires information representing a place where the own vehicle travels as information representing the traveling condition, and the process selection section selects the processes to be performed as the forward recognition process and the rearward recognition process according to the place where the own vehicle travels.

16. The recognition apparatus according to claim 15, wherein the speed of the own vehicle is low for a state in which the speed of the own vehicle is less than a predetermined speed, and the speed of the own vehicle is high for a state in which the speed of the own vehicle is greater than the predetermined speed.

17. The recognition apparatus according to claim 15, wherein the calculation section recognizes a predetermined plurality types of recognition targets based on the image information, and the process selection section selects a process for recognizing a recognition target included in the plurality types of recognition targets among processes included in the forward recognition process and the rearward recognition process, based on the information acquired by the acquisition section.

18. The recognition apparatus according to claim 17, wherein the recognition targets are classified with reference to whether the recognition targets are moving, and the process selection section selects a process for recognizing a recognition target that is moving in priority to a process for recognizing a recognition target that is not moving.

19. The recognition apparatus according to claim 17, wherein the recognition targets are classified with reference to distances from the own vehicle, and the process selection section selects a process for recognizing a recognition target whose distance from the own vehicle is short in priority to a process for recognizing a recognition target whose distance from the own vehicle is long.

20. The recognition apparatus according to claim 15, wherein the calculation section recognizes a recognition target by pattern matching based on dictionary information that is previously stored, and in the forward recognition process and the rearward recognition process, a recognition target ahead of the own vehicle and a recognition target behind the own vehicle are recognized by using the same dictionary information.

21. The recognition apparatus according to claim 15, wherein the calculation section includes an acquisition section that causes a display unit to display at least one of a forward image captured by the front camera and a rearward image captured by the rear camera, the display unit determines an image to be displayed based on information representing whether the own vehicle is in a state of moving forward or a state of moving rearward and information representing the traveling condition of the own vehicle, and in a case where the forward image and the rearward image are displayed together, part of the forward image and part of the rearward image are displayed.

* * * * *